Sept. 7, 1965
A. M. MOEN
3,204,654
DIVERTER FOR USE IN FAUCETS
Filed Oct. 23, 1962
5 Sheets-Sheet 1
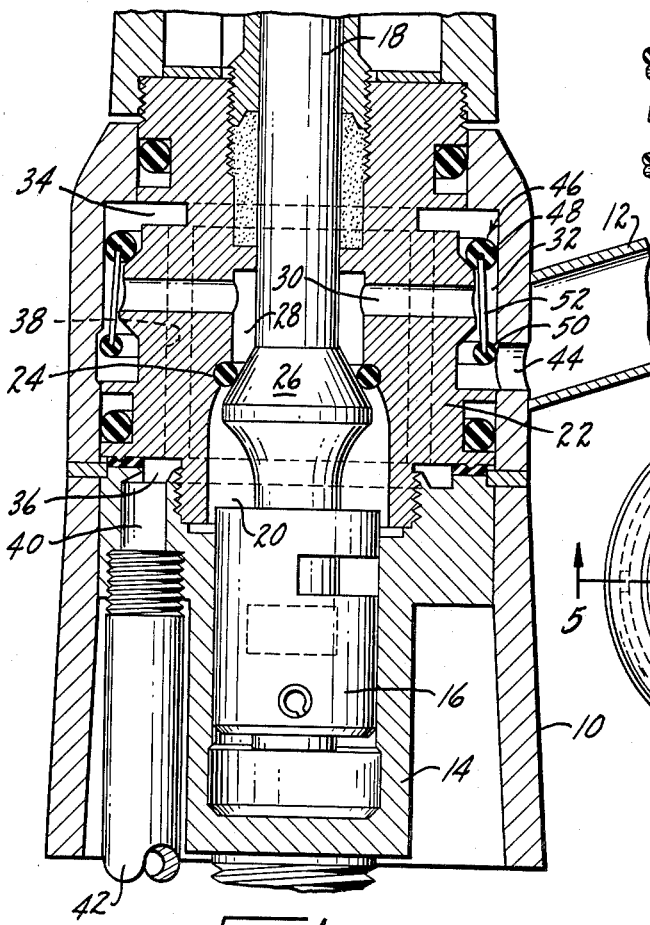
fig.1.
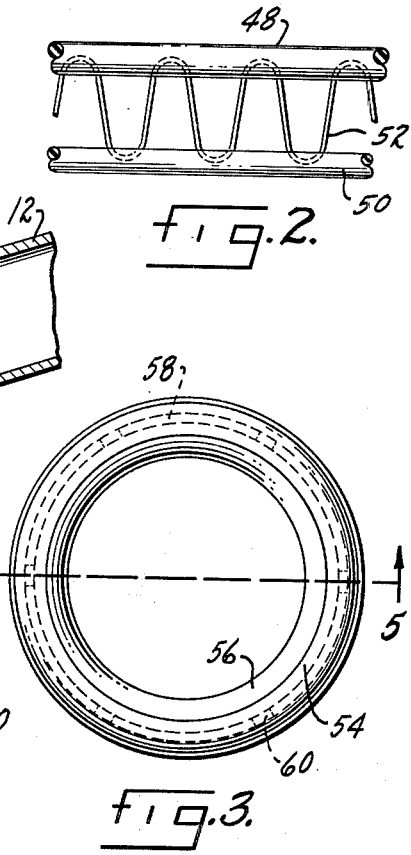
fig.2.
fig.3.
fig.4.
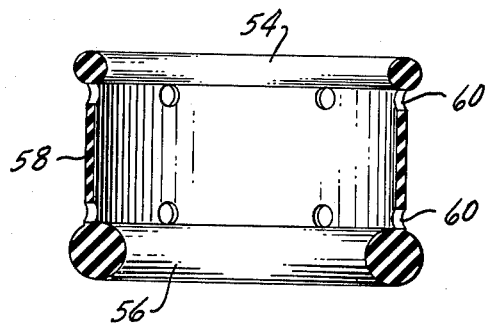
fig.5.
INVENTOR.
Alfred M. Moen,
BY Parker & Carter
Attorneys.

Sept. 7, 1965   A. M. MOEN   3,204,654
DIVERTER FOR USE IN FAUCETS
Filed Oct. 23, 1962   5 Sheets-Sheet 2
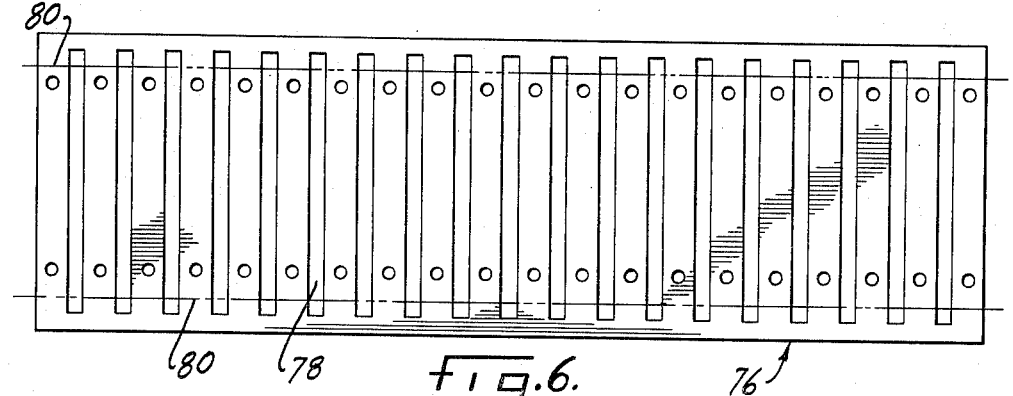
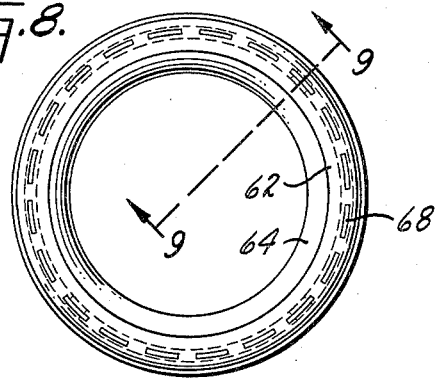
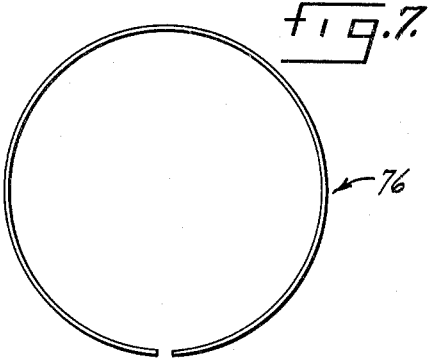
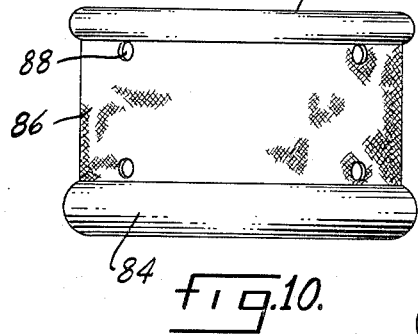
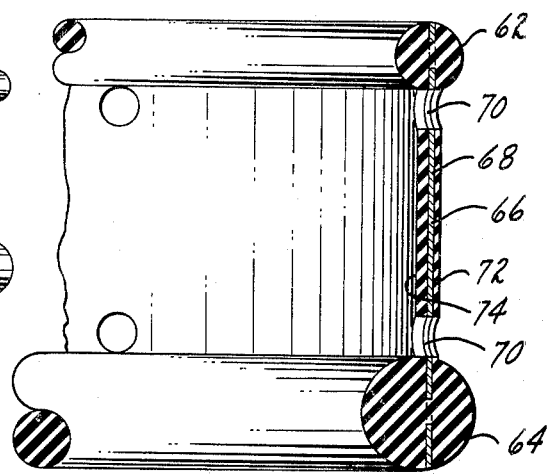
INVENTOR.
Alfred M. Moen,
BY Parker & Carter
Attorneys.

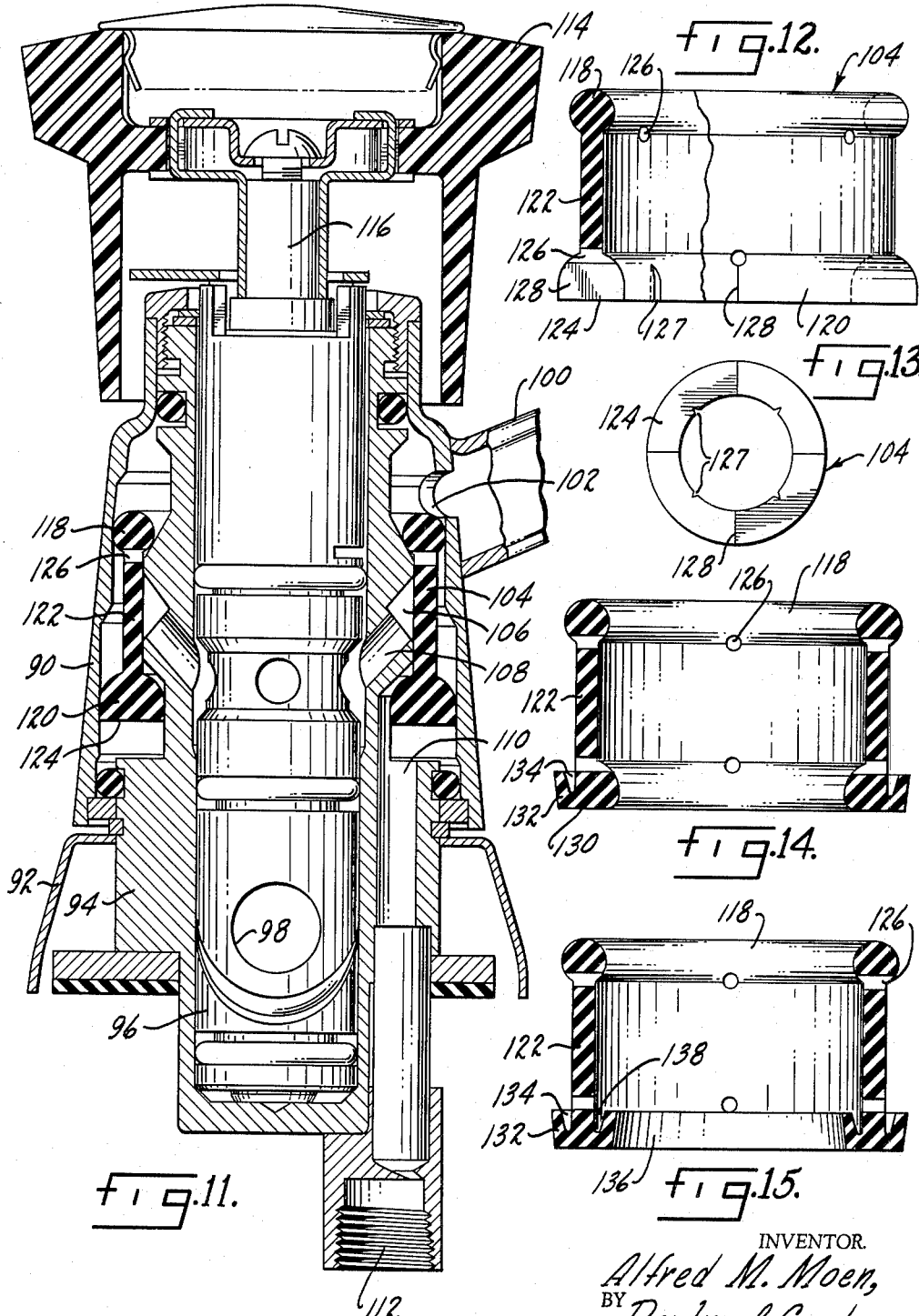

Sept. 7, 1965   A. M. MOEN   3,204,654
DIVERTER FOR USE IN FAUCETS
Filed Oct. 23, 1962   5 Sheets-Sheet 4
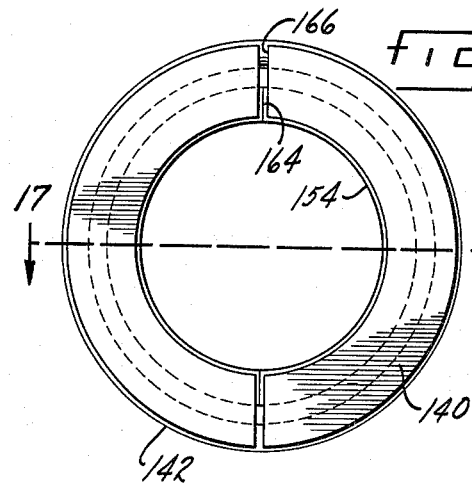
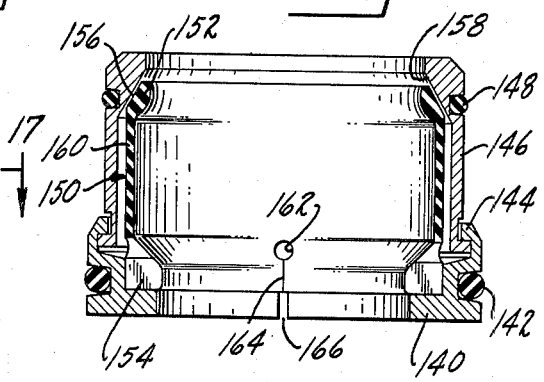
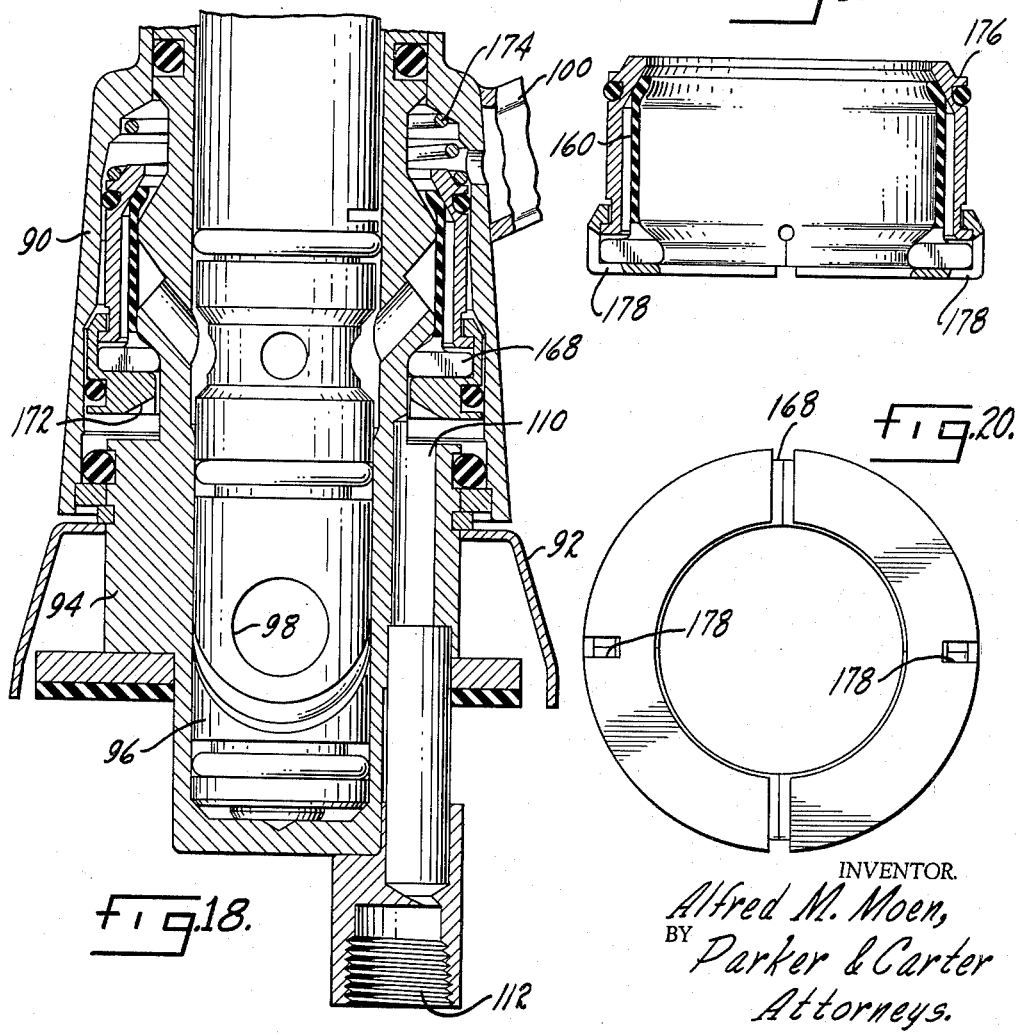
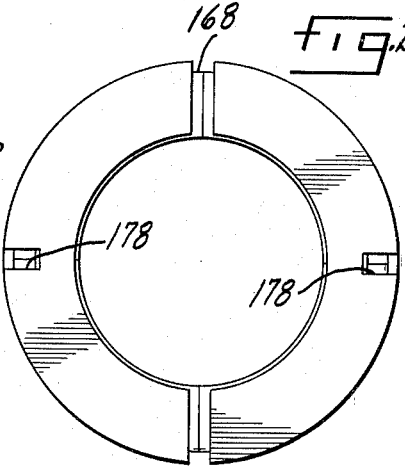
INVENTOR.
Alfred M. Moen,
BY Parker & Carter
Attorneys.

Sept. 7, 1965    A. M. MOEN    3,204,654
DIVERTER FOR USE IN FAUCETS
Filed Oct. 23, 1962    5 Sheets-Sheet 5

INVENTOR.
Alfred M. Moen,
BY Parker & Carter
Attorneys.

United States Patent Office 3,204,654
Patented Sept. 7, 1965

3,204,654
DIVERTER FOR USE IN FAUCETS
Alfred M. Moen, 25 Lakeview Drive, Grafton, Ohio
Filed Oct. 23, 1962, Ser. No. 232,471
22 Claims. (Cl. 137—119)

This invention relates to diverters for use in faucets or the like and is a continuation in part of my co-pending applications Serial No. 84,811, filed January 25, 1961, which is a continuation of Serial No. 588,102, filed May 29, 1956; Serial No. 117,117, filed June 14, 1961; and Serial No. 207,893, filed July 6, 1962.

Each of the above numbered applications has been abandoned, except Serial No. 207,893. The subject matter of none of them has been abandoned and in each case it is included in continuation and in the present application.

A primary purpose of this invention is to provide a cylindrical diverter for use in mixing faucets or the like.

Another purpose is to provide a diverter of the type described which forms an improved seal.

Another purpose is to provide a diverter of the type described which is reliable in operation.

Another purpose is to provide a diverter of the type described permitting easier water flow to the diverter discharge passage.

Other purposes will appear in the ensuing specification, drawings and claims.

Figure 21:
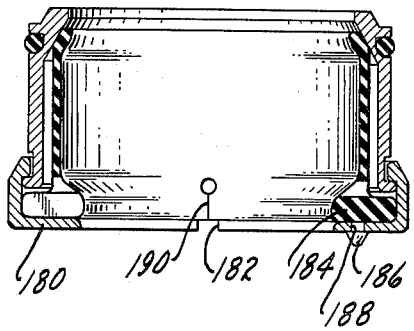
Figure 23:
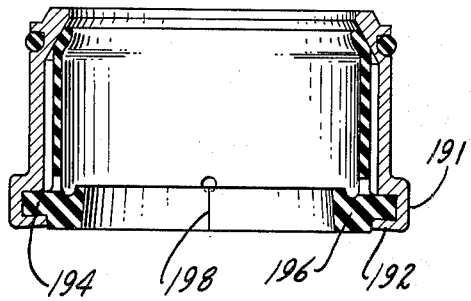
Figure 22:
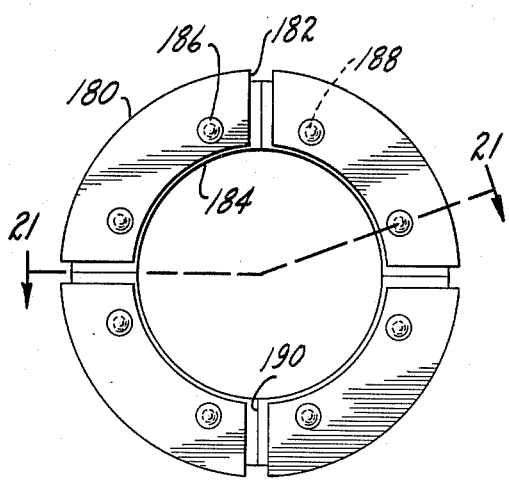

The invention is illustrated diagrammatically in the following drawings wherein:

FIGURE 1 is an axial section through a faucet illustrating one form of diverter, FIGURE 2 is a partial side view of the diverter in FIGURE 1, FIGURE 3 is a bottom plan view of a second form of diverter, FIGURE 4 is a side view of the diverter shown in FIGURE 3, FIGURE 5 is a section along plane 5—5 of FIGURE 3, FIGURE 6 is a plan view of a metal strip which may be used in a further form of diverter, FIGURE 7 is a top plan view of the strip shown in FIGURE 6 and positioned for assembly into a diverter, FIGURE 8 is a top plan view of an assembled diverter using the strip of FIGURES 6 and 7, FIGURE 9 is a section along plane 9—9 of FIGURE 8, FIGURE 10 is a side view of yet a further form of diverter, FIGURE 11 is an axial section through a second form of faucet showing yet a further form of diverter, FIGURE 12 is a side view, in part section, of a diverter for use in the faucet shown in FIGURE 11, FIGURE 13 is a bottom view of the diverter shown in FIGURE 12, FIGURE 14 is a section through still a further form of diverter, FIGURE 15 is a section through yet another form of diverter, FIGURE 16 is a bottom plan view of still a further form of diverter, FIGURE 17 is a section along plane 17–17 of FIGURE 16, FIGURE 18 is a partial axial section through a faucet housing showing still a further form of diverter, FIGURE 19 is a partial axial section showing yet a further form of diverter, FIGURE 20 is a bottom view of the diverter shown in FIGURE 19, FIGURE 21 is an axial section along plane 21–21 of FIGURE 22, showing yet a further form of diverter, FIGURE 22 is a bottom plan view of the diverter in FIGURE 21, and FIGURE 23 is an axial section through yet a further form of diverter.

In FIGURE 1, a housing 10 may mount a spout 12. Within the housing 10 is a valve housing 14 mounting a valve 16. The valve 16 may have an upstanding stem 18 which will be conventionally attached to a manual operating means. Rotation and reciprocation of the stem 18 and the valve 16 is effective to regulate the volume of water discharged from the valve 16 into a chamber 20. The chamber 20 may be defined by a cylindrical plug 22. I may position an O-ring 24 at the upper end of the chamber 20 to form a seal with a conical portion 26 of the stem 18. From the chamber 20 water will be directed into an upper chamber 28 and then out through passages 30 to a diverter chamber 32. The diverter chamber 32 is defined by the housing 10 and by the plug 22.

The diverter chamber 32 opens into an upper annular chamber 34 which is in communication with a lower annular chamber 36 by a plurality of downwardly extending passages 38. A passage 40 is in communication with annular passage 36 and is effective to direct water downwardly through a line 42 to an auxiliary discharge device, for example a spray or the like. Also in communication with the diverter chamber 32 is a port 44 which opens into the spout 12.

Positioned within the diverter chamber 32 is a diverter member indicated generally at 46 and shown particularly in FIGURE 2. As shown in FIGURES 1 and 2, the diverter may include a pair of spaced annular seal members, in the form of O-rings 48 and 50. The O-rings may be held together in a substantially fixed position, relative to each other, by a single wire 52 which is embedded in each of the O-rings and effectively forms an annular structure connecting the O-rings together. The spaces between each section of the wire 52 form openings for the passage of water.

In operation, the diverter normally will be in the position of FIGURE 1, and water will be discharged through the spout. There will always be a head of water backed up through line 42, passage 40 and up into the annular chamber 34. When the accessory discharge device is opened, there will be a sudden reduction in pressure behind the large upper O-ring 48 such that the diverter will move in an upward direction. The lower O-ring 50 will form a seal just above the passage 44 and no water will be directed to the spout. All the water will flow to the accessory discharge device.

FIGURES 3, 4 and 5 show a further form of diverter. A pair of spaced O-rings or annular seal members having a generally circular cross section are indicated at 54 and 56. The O-ring 56 is the larger O-ring and will generally be adjacent the diverter passage. In fact, if the diverter passage were below the spout port 44 in FIGURE 1, the diverter would be reversed. The O-rings 54 and 56 may be connected together by an annular sleeve 58 which may be formed of a rubber-like material or any other type of flexible material. I may provide a plurality of holes or openings 60 in the sleeve 58 for the passage of water. The annular seal members 54 and 56 may be molded integrally with the sleeve 58 and the sleeve may have generally the same diameter as the seal members.

FIGURES 6–9 show a third form of diverter. In order to prevent any stretch in the axial direction, which would not permit the diverter to function properly, I may position a plurality of metal strips in the annular sleeve that connects the O-rings or annular seal members. Considering FIGURE 9 first, a pair of annular seal members or O-rings 62 and 64, again generally similar in cross section but with the O-ring 62 being smaller, are connected together by an annular sleeve 66. The sleeve 66 includes a plurality of preferably generally equally spaced metal strips 68 which may extend completely through the O-rings 62 and 64, as will be described hereinafter. I may puncture or otherwise form a plurality of openings or holes 70 in the sleeve 66 for the passage of water. I may form an inner and outer layer of rubber or a suitable rubber substitute about the strips 68 in such a manner that the sleeve is generally continuous except for the openings 70. The outer layer is indicated at 72 and may be thinner than the inner layer 74.

In forming the diverter of FIGURE 9, I first take a metal strip 76, shown in FIGURE 6, which has a plurality of lateral, somewhat rectangular openings 78. I place such a strip in a generally circular form, as indicated in FIGURE 7, and then mold the sleeve layers and the O-rings about the metal strip. The sleeve and O-rings are molded in such a manner that the metal strip extends completely through the O-rings and projects outwardly from each of the O-rings. I then clip the metal strip off right at the O-ring, along the cut lines 80 indicated in FIGURE 6, so that the metal strip lies flush with the top of each of the O-rings. In this way I make or form a diverter which has sufficient radial stretch to be positioned in the faucet assembly, but has no axial stretch as the metal strips hold the O-rings in a fixed axial relationship.

FIGURE 10 indicates a further form of diverter including an upper O-ring or annular seal member 82 and a lower O-ring or annular seal member 84. Again the seal members may be generally equal in diameter but dissimilar in cross section with the upper seal member being smaller. The two seal members may be joined by a fabric sleeve 86 which has a plurality of openings 88 for the passage of water. The sleeve 86 will not stretch in the axial direction, but it will stretch radially.

FIGURE 11 shows a further form of faucet, such as is illustrated in my co-pending application Serial No. 207,893, filed July 6, 1962. A generally cylindrical slightly conical housing 90 may be mounted in a generally cup-shaped mounting member 92. Positioned within the housing 90 and the mounting member 92 is a valve body 94 mounting a valve cartridge 96. The valve cartridge 96 may have inlet ports 98 for hot and cold water, only one of said ports being shown. The valve cartridge 96 will not be explained in detail, as valve cartridges of this general type are illustrated in my co-pending application Serial No. 6,452, now Patent No. 3,103,231, filed February 3, 1960. What is important is that a valve means be positioned within the valve body which is effective to mix hot and cold water in the amounts desired and then to regulate the volume of the discharge of the water upon rotation and reciprocation of a valve stem.

A spout 100 fastened to the housing 90 may be in communication with the interior of the housing through a port 102. Mounted for up and down movement between the valve body 94 and the housing 90 is a diverter indicated generally at 104. The diverter 104 is positioned within the diverter chamber 106 which is in communication with the interior of the valve through a passage 108. The lower end of the valve body 94 may have an axially extending bore or passage 110 which directs water to an auxiliary discharge outlet 112. At the top of the housing 90 is a manual control 114 which is suitably connected to a stem 116 extending outwardly from the valve cartridge 96. Details of the faucet form no part of the present invention.

The diverter 104 is shown more particularly in FIGURES 12 and 13 and may include an upper annular seal member 118 and a lower annular seal member 120. An annular sleeve 122 may connect the two annular seal members and it may be integral with both of them. The annular seal member 118 may be generally circular in cross section and the lower annular seal member 120 may be slightly larger in cross section than the seal member 118 and may have a flat bottom 124. In order to provide a water passage through the diverter, the sleeve 122 may have a plurality of openings or apertures 126. In order to permit the passage of water downwardly along the inside surface of the diverter, I may form a plurality of notches or the like 127 in the inside surface of the annular seal member 120. The number of notches is not important, nor is their spacing. Also, I may slit the seal member 120, as at 128, so that the lower seal ring be expanded, under water pressure, to further permit water to flow downwardly to the diverter water passage 110. As shown in FIGURE 13, I may position a notch between each pair of adjacent slits. This construction is not necessary, but is advantageous.

FIGURES 14 and 15 show yet a further form of diverter. The principal difference between FIGURE 14 and FIGURES 12 and 13 is that the lower seal member 130 has an outwardly extending annular lip 132 which defines a small annular groove 134 about the periphery of the seal ring. This particular construction is advantageous in that it provides a good seal between the outside of the annular seal member 130 and the inside wall of the housing 90, while reducing the friction between these two surfaces when the diverter moves up and down. The lip 132 will flex and can be pushed inwardly, reducing the size of the groove 134, thereby permitting easier movement of the diverter within the diverter chamber.

FIGURE 15 is substantially the same as FIGURE 14 except that there is an inner annular lip 136 on the inside of the lower seal member 130. The annular lip 136 forms an annular groove 138 and the lip is again effective to provide a good seal but reduce friction when the diverter is reciprocated.

In FIGURES 16 and 17 a metal collar 140, which may be formed by two identical halves held together by an O-ring or the like 142, has an upwardly and inwardly directed flange 144 for holding a metal sleeve 146. An O-ring 148 may be positioned near the top of the sleeve for sealing purposes. Within the metal sleeve 146 is a rubber or rubber-like sleeve 150 having an upper annular seal member or ring 152 which fits against the upper end of sleeve 146 and a lower ring or enlargement or annular seal member 154. The upper annular seal member 152 may have an inwardly directed slanted surface 156 which fits against and mates with an inwardly directed slanted surface 158 on the sleeve 146. A web or sleeve 160 may connect the rings or seal members 152 and 154 and the web may have suitable openings or perforations 162. The bottom annular seal member 154 may have suitable slits or slots 164, similar to the slits described in FIGURES 12 and 13. In addition, there may be openings or the like 166 in the bottom of the collar 140, where the collar halves come together, to provide further water passages.

The diverter shown in FIGURE 18 differs from that shown in FIGURES 16 and 17 in that the lower annular seal member 168 is generally rectangular in shape, and when positioned within the collar, is permitted some degree of axial movement. There may be a circumferential chamfer or the like 172 along the inner surface of the collar to facilitate the passage of water. When the seal ring 168 is in the up position of FIGURE 18, no water will be able to come down through the diverter passage. However, when the spray has been opened, the seal member 168 and the entire sealing assembly formed of the two spaced annular seal members and the sleeve will move down. Also the metal sleeve structure enclosing the sealing means will move downward so that the upper seal member will seal off the passage from the inlet to the spout.

The diverter shown in FIGURE 18 differs from that described before in that a coil spring 174 or the like has been mounted in the upper end of the diverter chamber and normally biases the sleeve structure enclosing the sealing portion of the diverter in a downward direction. The spring 174 may seat at its lower end in an annular groove 176 formed in the upper end of the sleeve member 146. FIGURES 19 and 20 show a slightly different form in that there is no O-ring at the bottom of the collar. The two collar halves, once positioned within the diverter chamber, will remain in place. Note also that the axial thickness of the collar has been reduced. A further difference is that there may be a plurality of circumferentially spaced notches 178 in the outer surface of the collar to permit water to flow down on the outside of the sleeve structure and into the chamber below the diverter.

The diverter shown in FIGURES 19 and 20 operates in a slightly different manner from that described before. The spring 174 keeps the diverter in a normally down position. When the water is turned on, the diverter will move up and balloon out so that water may flow to the spout. The spring is effective to assist the diverter to move downwardly when the spray is operated.

Once the spray is operated water may flow through the openings in sleeve 160 and out through notches 178. Also, in some applications the internal surface of seal member 168 may be notched to facilitate the passage of water to the spray.

FIGURES 21 and 22 show a diverter structure substantially similar to that shown in FIGURES 19 and 20. The lower collar 180 may be formed in four similar sections, as clearly shown in FIGURE 22, so that there is a gap 182 between each section. The lower annular seal ring 184 may have a plurality of downwardly extending projections 186 which pass through openings or holes 188 in the collar sections and thereby hold the collar sections and seal ring together. The seal ring 184 may have a plurality of slits 190 in alignment with the gaps 182 so that, under water pressure, the lower seal ring and collar may expand and allow water to flow downwardly to the diverter passage.

FIGURE 23 shows yet a further form of diverter. In this form the outer metal sleeve structure is of one piece construction and has a lower collar-like section 191 with an inwardly directed lower flange 192. The flange 192 may be crimped inwardly to engage an outwardly extending flange 194 on the lower seal ring 196. Again, the lower seal ring may have slits 198 to permit expansion.

The use, operation and function of the invention are as follows:

This invention is particularly directed to improvements in cylindrical diverters of the type that normally are used in mixing faucets. The invention should not be limited to a diverter for use in a mixing faucet as the diverter may be used in other types of faucets.

In general, the diverter includes a pair of spaced annular seal members, which may be in the form of O-rings, or may take other shapes. The two spaced annular seal members are maintained in a substantially fixed position, relative to each other, by an annular structure which has holes or perforations or spaces for the passage of water. It is important that there be no axial stretch to the diverter or otherwise it would not properly perform its sealing function.

In some forms of the invention the diverter merely includes a pair of spaced annular seal members and an annular flexible sleeve, preferably integral with the seal members, for preventing axial stretch. In another form of the invention the diverter includes this structure along with an outer metal sleeve structure which reciprocates with the diverter, during operation.

Various modifications may be made to the structure described above. For example, there may be slits or internal notches in the diverter to facilitate the passage of water along its inside surface and generally downwardly to an auxiliary discharge device. In addition, there may be notches in the external sleeve structure, as illustrated in FIGURES 19 and 20, to form further water passages.

In operation, in all forms of the diverter, the annular sleeve will be positioned generally opposite the inlet to the diverter chamber. When water pressure is applied through this inlet, the annular sleeve will balloon out, and water will flow up over the upper annular seal member and then out to the spout. In the alternative, when the accessory discharge device is opened, the diverter, considering all forms except that shown in FIGURES 1 and 2, will first be reciprocated downwardly by the water pressure differential created below the diverter to a position where the water may flow either down along the inside of the diverter or outwardly through the diverter, depending upon the type of diverter.

Although many modifications of the diverter are shown and many different forms are described, it should be realized that basically the diverter is cylindrical, it includes an upper and lower annular seal member, and an annular structure connecting these two seal members fixing their position relative to each other.

Whereas the preferred form of the invention has been shown and described herein, it should be realized that there are many modifications, substitutions and alterations thereto within the scope of the following claims.

I claim:

1. A generally cylindrical diverter for use in a faucet, including means forming a pair of spaced annular seal portions, with each portion having an inner diameter and an outer diameter, means for maintaining said annular seal portions a substantially fixed distance apart including an annular structure connected to said spaced seal portions and concentric therewith, said annular structure having openings therein for the passage of water.

2. The structure of claim 1 further characterized in that at least one of said annular seal portions is generally circular in cross section.

3. The structure of claim 1 further characterized in that both of said annular seal portions are generally circular in cross section.

4. The structure of claim 1 further characterized in that said annular seal portions are generally circular in cross section, with one of said seal portions having a larger cross section than the other.

5. The structure of claim 1 further characterized in that said annular structure includes a flexible annular sleeve having a radial thickness smaller than the cross section of said annular seal portions.

6. The structure of claim 5 further characterized in that said annular sleeve is formed of a rubber-like material and is integral with said annular seal portions.

7. The structure of claim 1 further characterized in that said annular structure includes an annular sleeve of a flexible material, said annular seal portions being larger in cross section than the radial thickness of said flexible sleeve, with one of said annular seal portions having a larger cross section than the other.

8. The structure of claim 7 further characterized in that the smaller of said annular seal portions is generally circular in cross section with the larger of said annular seal portions having a generally flat bottom.

9. The structure of claim 7 further characterized in that the annular seal portion having the largest cross section has an annular lip about its lower edge.

10. The structure of claim 9 further characterized in that said annular lip extends outwardly from said annular seal portion.

11. The structure of claim 1 further characterized in that said annular structure includes an annular flexible sleeve, integral with said annular seal portions, and an outer metal sleeve structure enclosing said seal portions and flexible sleeve.

12. The structure of claim 11 further characterized in that said outer metal sleeve structure is radially spaced from said flexible sleeve.

13. The structure of claim 11 further characterized in that one of said annular seal portions has a substantially larger cross section than the other.

14. The structure of claim 11 further characterized in that said metal sleeve structure includes a sectional collar at one end of the sleeve structure, and a unitary sleeve member extending beyond one of said annular seal portions, said sectional collar enclosing the other annular seal portion.

15. The structure of claim 14 further characterized in that said sectional collar is held together by an exterior annular sealing ring.

16. The structure of claim 14 further characterized in that said unitary sleeve has an inwardly directed slanted surface, which mates with a similar inwardly directed slanted surface on said one annular seal portion.

17. The structure of claim 14 further characterized in that said collar is loosely fixed to said metal sleeve.

18. The structure of claim 14 further characterized in that said annular seal portions and the flexible sleeve connecting them are loosely mounted in said metal sleeve structure.

19. The structure of claim 14 further characterized in that said sectional collar is fixed to one of said annular seal portions.

20. The structure of claim 11 further characterized in that said metal sleeve structure is of one piece construction.

21. The structure of claim 11 further characterized by a plurality of circumferentially spaced notches in the outer surface of said metal sleeve structure.

22. A transfer valve, including means defining an annular chamber with two outlets and one inlet, a reciprocal diverter member in said chamber, said diverter member having spaced annular seal members, one on each side of said inlet, and an annular flexible sleeve integral with said annular seal members and holding them a substantially fixed distance apart, and openings in said diverter for the passage of water from one side of said sleeve to the other.

No references cited.

LAVERNE D. GEIGER, *Primary Examiner.*

MILTON KAUFMAN, *Examiner.*